United States Patent
Vukosav et al.

(10) Patent No.: US 11,787,523 B2
(45) Date of Patent: Oct. 17, 2023

(54) AIRCRAFT KEEL BEAM ASSEMBLY

(71) Applicant: The Boeing Company, Chicago, IL (US)

(72) Inventors: Danilo Vukosav, Kirkland, WA (US); Daniel Justin Cox, Seattle, WA (US); Evgeniy Potupchik, Renton, WA (US); Ryan Matthew Slater, Seattle, WA (US); Eric Gruner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 17/464,872

(22) Filed: Sep. 2, 2021

(65) Prior Publication Data

US 2022/0212773 A1 Jul. 7, 2022

Related U.S. Application Data

(60) Provisional application No. 63/134,587, filed on Jan. 6, 2021.

(51) Int. Cl.
*B64C 1/06* (2006.01)
*B64C 1/10* (2006.01)

(52) U.S. Cl.
CPC .............. *B64C 1/068* (2013.01); *B64C 1/065* (2013.01); *B64C 1/10* (2013.01)

(58) Field of Classification Search
CPC .. B64C 1/26; B64C 1/06; B64C 1/065; B64C 1/10; B64C 1/061; B64C 1/064; B64C 1/08; B64C 1/18
See application file for complete search history.

(56) References Cited

U.S. PATENT DOCUMENTS 2,379,352 A * 6/1945 Hardman .................. B64C 3/00
244/124
7,810,756 B2 * 10/2010 Alby ......................... B64C 1/26
52/246

(Continued)

FOREIGN PATENT DOCUMENTS

CN 106114813 A * 11/2016 ............. B64C 1/061

OTHER PUBLICATIONS

Michael Chun-Yung Niu, Airframe Structural Design, Jan. 1999, Hong Kong Conmilit Press LTD, Second Edition, pp. 406-412. (Year: 1999).*

(Continued)

*Primary Examiner* — Joshua J Michener
*Assistant Examiner* — Ryan Andrew Yankey
(74) *Attorney, Agent, or Firm* — Duft & Bornsen, PC

(57) ABSTRACT

Embodiments for aircraft keel beam assembly. One embodiment is a keel beam assembly of an aircraft. The keel beam assembly includes a keel attach chord to connect to a wing center section of the aircraft, the keel attach chord extending in a longitudinal direction between a rear spar and front spar of the aircraft. The keel beam assembly also includes a lower chord disposed underneath the keel attach chord and extending in the longitudinal direction between an aft wheel well bulkhead and a forward bulkhead of the aircraft. The keel beam assembly further includes a forward web to couple the keel attach chord and the lower chord, the forward web including a front edge extending in a diagonal direction from the keel attach chord that is downward and aft toward the lower chord to create an open area forward from the front edge.

20 Claims, 4 Drawing Sheets

(56) References Cited

U.S. PATENT DOCUMENTS

| | | | | |
|---|---|---|---|---|
| 8,317,133 | B2* | 11/2012 | Nolla | B64C 1/18 |
| | | | | 244/119 |
| 8,544,789 | B2* | 10/2013 | Gallant | B64C 1/068 |
| | | | | 244/38 |
| 9,199,719 | B2* | 12/2015 | Durand | B64C 3/185 |
| 9,452,818 | B2* | 9/2016 | Loyant | B64C 1/26 |
| 11,649,033 | B2* | 5/2023 | Vukosav | B64C 1/064 |
| | | | | 244/119 |
| 2008/0173765 | A1* | 7/2008 | Muller | B64C 1/061 |
| | | | | 166/243 |
| 2010/0170987 | A1* | 7/2010 | Meyer | B64C 7/00 |
| | | | | 244/120 |
| 2012/0091269 | A1* | 4/2012 | Lopez-Reina | B64D 45/02 |
| | | | | 244/1 A |
| 2013/0228655 | A1* | 9/2013 | Burgunder | B64C 25/02 |
| | | | | 244/214 |
| 2014/0175223 | A1* | 6/2014 | Durand | B64C 1/18 |
| | | | | 244/119 |
| 2016/0185451 | A1* | 6/2016 | Bellet | B64C 1/18 |
| | | | | 244/129.1 |

OTHER PUBLICATIONS

Kaman Engineering Services Overview, Jul. 2014, Kaman Engineering Services (Year: 2014).*

* cited by examiner

AIRCRAFT KEEL BEAM ASSEMBLY

RELATED APPLICATIONS

This non-provisional patent application claims priority to U.S. Provisional Patent Application No. 63/134,587 filed on Jan. 6, 2021, which is incorporated by reference as if fully provided herein.

FIELD

This disclosure relates to the field of aircraft and, in particular, to a keel beam assembly of an aircraft.

BACKGROUND

Large aircraft typically have a large cutout at the bottom side of the fuselage to accommodate the wing structure and main landing gear bay. To provide structural support for this cutout, the aircraft may include a keel beam disposed underneath the center wing box extending longitudinally, or forward and aft, through the cutout. In addition to transferring fuselage forces in the longitudinal direction, the keel beam may also provide structure that protects the aircraft in the event of a wheels-up emergency landing. However, the load path that a typical keel beam provides may involve complicated structure that interferes with installation of environmental control systems (e.g., aircraft ducts). Additionally, the structural support of the keel beam may cause undesirable force coupling between the fuselage and wings.

SUMMARY

Embodiments described herein provide a keel beam assembly for an aircraft. The keel beam assembly includes a cutback configuration at its forward end. This provides a technical benefit in providing flexibility in the keel beam assembly that enables increased independent movement as between the wings and fuselage pressure barrier of the aircraft, and the shape of the cutout reduces an undesirable stress concentration. Additionally, the cutback configuration creates an increased open area for improved assembly of the keel beam to the aircraft and improved installation of aircraft systems, such as environmental control systems. Furthermore, despite the increased open area, the cutback configuration provides sufficient vertical support for a wheels-up emergency landing.

One embodiment is a keel beam assembly of an aircraft. The keel beam assembly includes a keel attach chord to connect to a wing center section of the aircraft, the keel attach chord extending in a longitudinal direction between a rear spar and front spar of the aircraft. The keel beam assembly also includes a lower chord disposed underneath the keel attach chord and extending in the longitudinal direction between an aft wheel well bulkhead and a forward bulkhead of the aircraft. The keel beam assembly further includes a forward web to couple the keel attach chord and the lower chord, the forward web including a front edge extending in a diagonal direction from the keel attach chord that is downward and aft toward the lower chord to create an open area forward from the front edge.

Another embodiment is an aircraft including a fuselage, a wing center section, and a fuselage cutout to house the wing center section. The fuselage cutout defined by a forward bulkhead and an aft bulkhead of the fuselage. The aircraft also includes a keel beam assembly extending through the fuselage cutout from the aft bulkhead to the forward bulkhead, the keel beam assembly includes a forward web at a forward end of the keel beam assembly, the forward web including a front edge extending in a diagonal direction that is downward and aft toward to create an open area forward from the front edge and aft of the forward bulkhead of the fuselage.

Yet another embodiment is a keel beam assembly of an aircraft. The keel beam assembly includes a pair of keel attach chords to connect to a wing center section of the aircraft, and a pair of lower chords disposed underneath the pair of keel attach chords to span a fuselage cutout of the aircraft from an aft bulkhead to a forward bulkhead. The keel beam assembly also includes a pair of forward webs to form sidewalls connecting the pair of keel attach chords to the pair of lower chords, wherein the forward webs include a cutback frontside that extends in a diagonal direction from the pair of keel attach chords that is downward and aft toward the pair of lower chords to create an open area between the forward bulkhead and the keel beam assembly.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific example embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
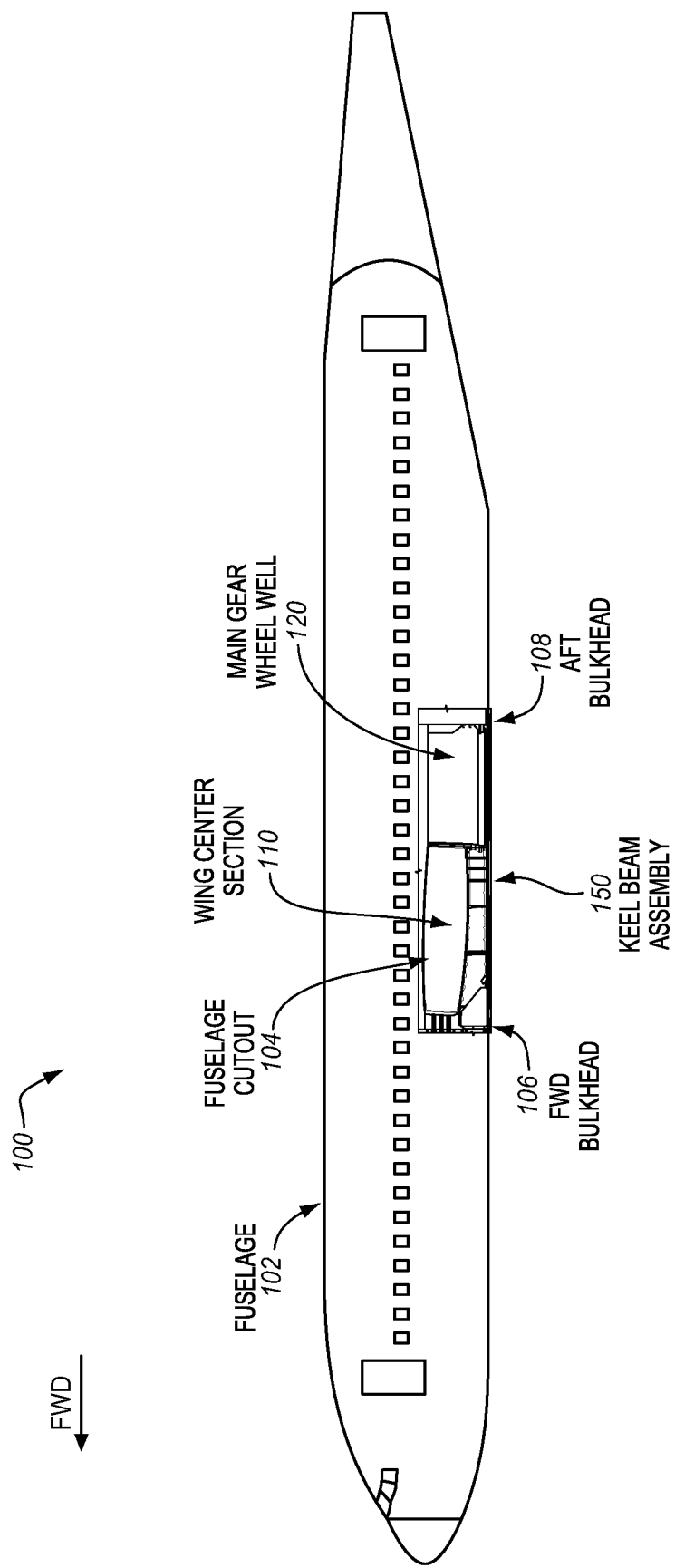
FIG. 1 is a side view of an aircraft in an illustrative embodiment.

FIG. 1 is a side view of an aircraft 100 in an illustrative embodiment. The aircraft includes a fuselage 102 with a fuselage cutout 104 along its bottom side to accommodate a wing center section 110 and a main gear wheel well 120. The wing center section 110 includes structure coupling the wings (not shown) and fuselage 102 of the aircraft 100. The main gear wheel well 120 is configured to store the main landing gear of the aircraft 100 during flight. The fuselage cutout 104 is an open area in the fuselage 102 defined by a forward bulkhead 106 and aft bulkhead 108. That is, the forward bulkhead 106 may comprise a vertical barrier (sometimes referred to as a fuselage pressure barrier) to a forward fuselage section and the aft bulkhead 108 may comprise a vertical barrier to an aft fuselage section.

The aircraft 100 includes a keel beam assembly 150 for structural support of the fuselage cutout 104. The keel beam assembly 150 extends in a longitudinal direction, or forward and aft, between the forward bulkhead 106 and the aft bulkhead 108 and is configured to absorb compressive loads of the fuselage 102. In addition to transferring loads forward and aft through the fuselage cutout 104, the keel beam assembly 150 transfers load between the wings and fuselage 102 and also protects the fuselage 102 in case of a wheels-up emergency landing of the aircraft 100. However, the load path that a typical keel beam provides may involve complicated structure that interferes with installation of environmental control systems (e.g., aircraft ducts). Additionally, the structural support provided by a typical keel beam may cause undesirable force coupling between the fuselage 102 and wings of the aircraft 100.

The keel beam assembly 150 is therefore enhanced with a cutback configuration that provides increased space for assembling the keel beam assembly 150 to the fuselage 102 and installing aircraft systems, such as environmental control systems. The keel beam assembly 150 configuration advantageously simplifies integration with the forward bulkhead 106 and reduces keel web stress concentration. Moreover, the keel beam assembly 150 provides sufficient load path from the ground to the forward bulkhead 106 in case of a wheels-up emergency landing while realizing cost and weight savings. Additional details and technical benefits of the keel beam assembly 150 are discussed below.

Figure 2:
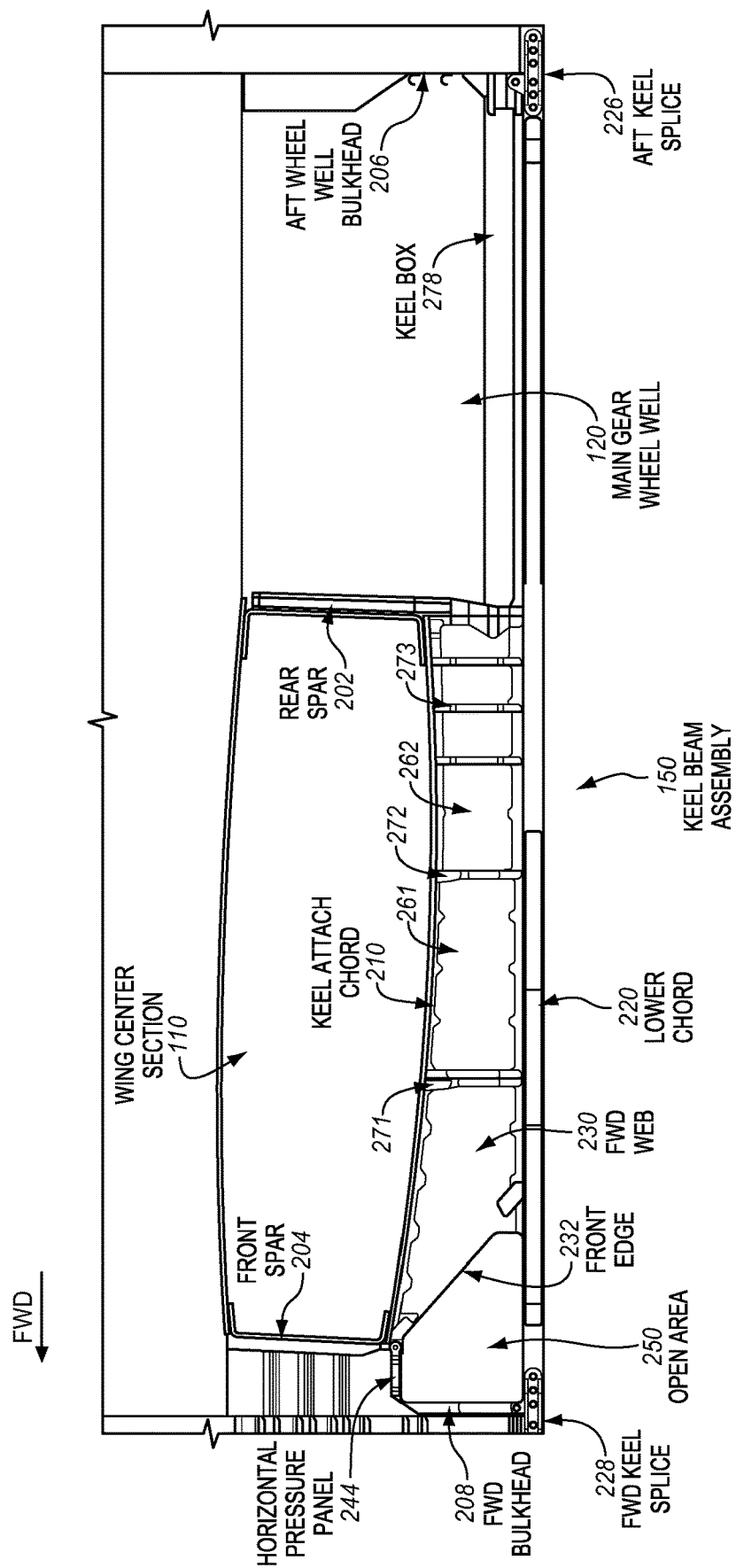
FIG. 2 is a side view of the keel beam assembly in an illustrative embodiment.

FIG. 2 is a side view of the keel beam assembly 150 in an illustrative embodiment. As shown in FIG. 2, a forward portion of the keel beam assembly 150 is disposed underneath the wing center section 110 and an aft portion of the keel beam assembly bridges the main gear wheel well 120 aft of the wing center section 110. The keel beam assembly 150 includes a keel attach chord 210 to support and/or connect to the wing center section 110. The keel beam assembly 150 also includes a lower chord 220 disposed underneath the keel attach chord 210. The keel attach chord 210 and lower chord 220 generally comprise beam support structures for the fuselage cutout 104.

In one embodiment, and as shown in FIG. 2, the forward bulkhead 106 and a horizontal pressure panel 244 of the fuselage 102 comprises a front spar offset pressure barrier. In this configuration, the front spar 204 and forward bulkhead 208 are offset, with the front spar 204 disposed aft of the forward bulkhead 208. In such embodiments, the keel attach chord 210 extends in a longitudinal direction between a rear spar 202 and front spar 204 of the aircraft 100, and the lower chord 220 extends in the longitudinal direction between an aft wheel well bulkhead 206 and a forward bulkhead 208 of the aircraft 100, as shown in FIG. 2. The lower chord 220 is attached to the forward bulkhead 208 via a forward keel splice 228, and attached to the aft wheel well bulkhead 206 via an aft keel splice 226. The aft keel splice 226 may also attach the keel attach chord 210 to the aft wheel well bulkhead 206. However, it will be appreciated that the keel beam assembly 150 may attach with fuselage 102 in alternative configurations including non-offset versions of the forward bulkhead 106.

The keel beam assembly 150 further includes a forward web 230 to couple the keel attach chord 210 and the lower chord 220. The forward web 230 includes a front edge 232 extending in a diagonal direction from the keel attach chord 210 that is downward and aft toward the lower chord 220 to create an open area 250 forward from the front edge 232.

The forward web 230 thus includes a cutback configuration which increases the size of the open area 250 as compared to vertical structure in this region that may otherwise occupy this area. The keel beam assembly 150 thus includes a front end or front portion that provides a cutout for improved ergonomic access for installing the keel beam assembly 150 and various aircraft systems (e.g., environment control systems, wires for thermal sensor, duct burst sensors, etc.). Additionally, the cutback configuration of the forward web 230 provides a technical benefit in providing flexibility in the keel beam assembly 150 that enables increased independent movement as between the wings and fuselage 102 of the aircraft 100 and the shape of the cutout reduces an undesirable stress concentration.

The open area 250 extends in a transverse direction, or an inboard/outboard direction, across the fuselage 102 and is sized to accommodate environmental control systems for the aircraft 100. Generally, the open area 250 is disposed aft of the forward bulkhead 208 and forward from the front edge 232 of the forward web 230. The open area 250 may also be generally disposed underneath the front spar 204 and above the lower chord 220. In one embodiment, the open area 250 is enclosed or defined by the front edge 232 of the forward web 230, the lower chord 220, the forward bulkhead 208, and/or the supporting structure of the front spar 204. In one embodiment, the open area 250 is created by removing the lightly loaded portion of the forward web 230.

An aft portion of the keel beam assembly 150 may include a keel box 278 disposed over the lower chord 220 and extending between the aft wheel well bulkhead 206 and the rear spar 202. A forward portion of the keel beam assembly 150 may include, in addition to the forward web 230, one or more mid webs 261 and one or more aft webs 262 which are disposed aft of the forward web 230. Vertical support structures 271-273 coupling between the lower chord 220 and keel attach chord 210 may be provided along the forward portion to support underneath the wing center section 110. For instance, a first vertical support structure 271 and a second vertical support structure 272 may support directly underneath respective spanwise beams (not shown) of the wing center section 110. The vertical support structures 271-273 may frame the under-wing web panels 230 and 261-262 for stability. In one embodiment, the forward web 230 may include a wall structure in a vertical plane with sides defined by a boundary of the first vertical support structure 271, lower chord 220, front edge 232, and keel attach chord 210. In some embodiments, a rear portion of the front edge 232 extends vertically downward to create a trapezoid-shaped corner of the cutout.

Figure 3:
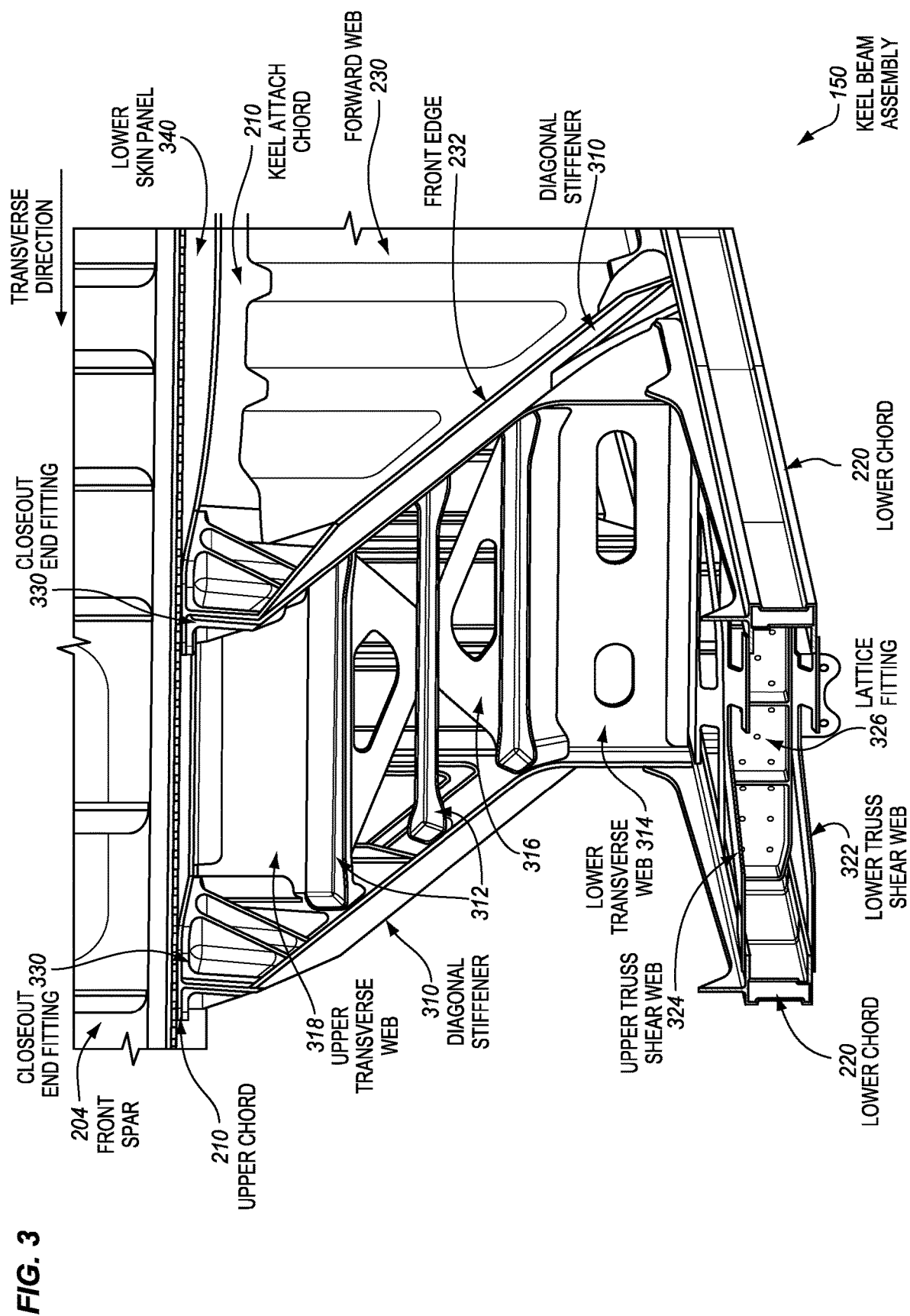
FIG. 3 is a front perspective view of the keel beam assembly in an illustrative embodiment.

FIG. 3 is a front perspective view of the keel beam assembly 150 in an illustrative embodiment. FIG. 3 generally shows that the keel beam assembly 150 is symmetrical with pairs of structural components that mirror each other about a center line, forming mirrored left and right sides with respect to the transverse direction. As such, the keel beam assembly may include a pair of keel attach chords 210, a pair of lower chords 220, and a pair of forward webs 230. The pair of forward webs 230 form sidewalls which respectively connect one of the pair of keel attach chords 210 to a corresponding one of the pair of lower chords 220. The forward webs 230 include a cutback frontside, or front edge 232, that extends in a diagonal direction from the pair of keel attach chords 210 that is downward and aft toward the pair of lower chords 220. This creates the open area 250 between the forward bulkhead 106 (not shown in FIG. 3) and the keel beam assembly 150, as earlier described.

As further shown in FIG. 3, keel beam assembly 150 includes a diagonal stiffener 310 disposed along the front edge 232 of each forward web 230. The diagonal stiffener 310 is configured to provide a vertical load path for the keel beam assembly 150. That is, the diagonal stiffener 310 strengthens the structural support for vertical forces acting on the keel beam assembly 150. The diagonal stiffener 310 may thus help the keel beam assembly 150 provide sufficient vertical support for a wheels-up emergency landing while also providing an increased size of the open area 250. The pair of diagonal stiffeners 310 are coupled with each other with one or more transverse stiffeners 312 and/or one or more transverse webs 314-318 extending inboard/outboard and configured to strengthen the cutback frontend of the keel beam assembly 150. The transverse webs may include a lower transverse web 314, a transverse closing web 316, and an upper transverse web 318.

The pair of lower chords 220 may be coupled with each other with a lower truss shear web 322 and an upper truss shear web 324 and/or a lattice fitting 326. This structure extends inboard/outboard to strengthen the front-end portion of the lower chords 220 that is underneath the open area 250 to prevent buckling of the unsupported cutout length due to the cutback configuration. In some embodiments, webs of the keel beam assembly 150, including the forward webs 230, transverse webs 314-318, and shear webs 322-324 include a sheet-like metal structure such as aluminum to provide wall structure between beams of the keel beam assembly 150. Webs of the keel beam assembly 150 may be integrally machined with diagonal stiffeners 310 and/or stiffeners/ribs for increased strength of the keel beam assembly 150 and support of the wing center section 110.

The keel beam assembly 150 also includes a pair of closeout end fittings 330 to couple the pair of diagonal stiffeners 310 with the pair of keel attach chords 210. In some embodiments, the corner at which the forward web 230 joins the keel attach chord 210 is disposed directly underneath the front spar 204. FIG. 3 also shows that the keel attach chord 210 may support underneath and/or attach with a lower skin panel 340 of the wing center section 110. Additionally, the keel beam assembly 150 may include one or more vertical stiffeners disposed at an inboard side of the forward web 230 that extends in a vertical direction and across the diagonal stiffener 310 to connect the lower chord 220 and the keel attach chord 210. The vertical stiffeners 410 may provide structural support and stability for the wing stringers and stability for the keel beam webs.

Figure 4:
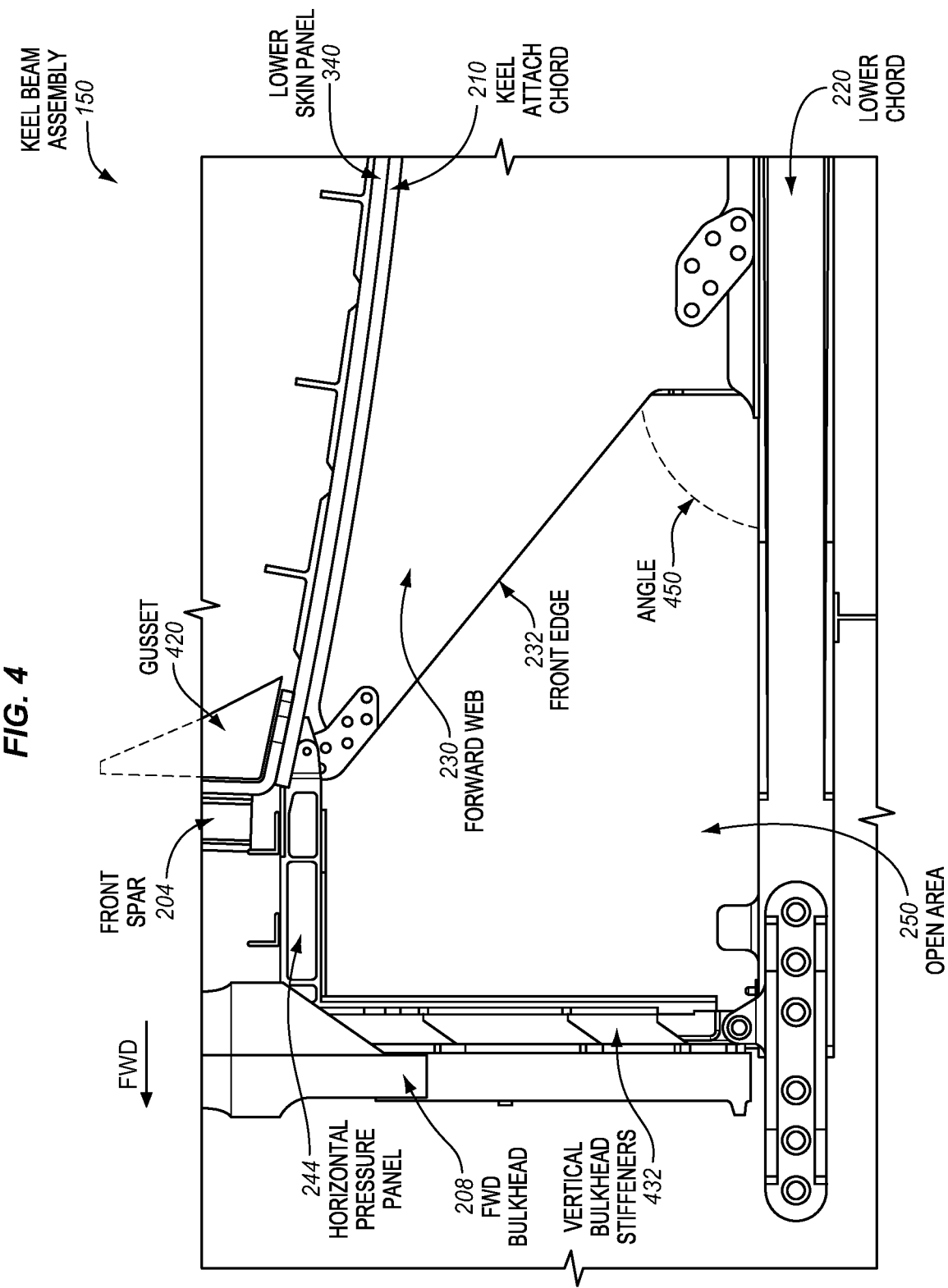
FIG. 4 is a side view of a front portion of the keel beam assembly in an illustrative embodiment.

FIG. 4 is a side view of a front portion of the keel beam assembly 150 in an illustrative embodiment. The wing center section 110 may include a gusset 420 to support the vertical load path for the diagonal stiffener 310. The gusset 420 may help prevent a radius of the front spar 204 from opening in failsafe cases such as rotorburst. In one embodiment, a front edge 232 (or diagonal stiffener 310—not shown) of the forward web 230 extends from its front end disposed underneath the gusset 420 (e.g., with respect to forward/aft direction) to its back end attached with the lower chord 220. The front edge 232 and/or diagonal stiffener 310 may thus integrate with a front spar offset pressure barrier configuration and support the front spar 204 in offset alignment with the forward bulkhead 208. Additional structure for the front spar offset pressure barrier may include one or more vertical bulkhead stiffeners 432 and one or more horizontal pressure panels 244.

The front edge 232 of the forward web 230 extends in the diagonal direction (e.g., downward back toward a tail of the aircraft 100) at angle 450. The angle 450 may be defined as between the lower chord 220 and the front edge 232 of the forward web 230. In one embodiment, the angle 450 is in a range from thirty degrees to fifty degrees. In one particular embodiment, the angle 450 is approximately thirty-seven degrees. However, it will be appreciated that technical benefits of the keel beam assembly 150 described herein may be realized with alternative cutback angles.

Although specific embodiments were described herein, the scope is not limited to those specific embodiments. Rather, the scope is defined by the following claims and any equivalents thereof.

What is claimed is:

1. A keel beam assembly of an aircraft, the keel beam assembly comprising:
   a keel attach chord to connect to a wing center section of the aircraft, the keel attach chord extending in a longitudinal direction between a rear spar and front spar of the aircraft, wherein the keel attach chord is external to and underneath the wing center section, wherein the keel attach chord is attached to a lower skin panel of the wing center section;
   a lower chord disposed underneath the keel attach chord and extending in the longitudinal direction between an aft wheel well bulkhead and a forward bulkhead of the aircraft; and
   a forward web to couple the keel attach chord and the lower chord, the forward web including a front edge extending in a diagonal direction from the keel attach chord that is downward and aft toward the lower chord to create an open area forward from the front edge, wherein a corner at which the forward web joins the keel attach chord is disposed directly underneath the front spar.

2. The keel beam assembly of claim 1 wherein:
   the open area extends in a transverse direction across a fuselage of the aircraft,
   the open area is enclosed by the front edge of the forward web, the lower chord, and the forward bulkhead.

3. The keel beam assembly of claim 2 wherein:
   the open area is disposed underneath the front spar and above the lower chord, and
   the open area is disposed aft of the forward bulkhead and forward from the front edge of the forward web.

4. The keel beam assembly of claim 1 wherein:
   the open area is sized to accommodate access for installing the keel beam assembly into an aircraft.

5. The keel beam assembly of claim 1 further comprising:
   a diagonal stiffener disposed along the front edge of the forward web and configured to provide a vertical load path for the keel beam assembly.

6. The keel beam assembly of claim 1 wherein:
   the lower chord is attached to the forward bulkhead via a forward keel splice, and
   the lower keel chord and the keel attach chord are attached to the aft wheel well bulkhead via an aft keel splice.

7. The keel beam assembly of claim 1 wherein:
   the front edge of the forward web is configured to provide flexibility in the keel beam assembly to allow independent movement between a fuselage pressure barrier and wings of the aircraft.

8. The keel beam assembly of claim 1 wherein:
   the front edge of the forward web extends in the diagonal direction at angle in a range from thirty degrees to fifty degrees, the angle being between the lower chord and the front edge of the forward web.

9. An aircraft comprising:
a fuselage;
a wing center section;
a fuselage cutout to house the wing center section, the fuselage cutout defined by a forward bulkhead and an aft bulkhead of the fuselage; and
a keel beam assembly extending through the fuselage cutout from the aft bulkhead to the forward bulkhead, wherein the keel beam assembly is external to and underneath the wing center section, the keel beam assembly comprising:
a forward web at a forward end of the keel beam assembly, the forward web including a front edge extending in a diagonal direction that is downward and aft toward to create an open area forward from the front edge and aft of the forward bulkhead of the fuselage.

10. The aircraft of claim 9 wherein the keel beam assembly further comprises:
a keel attach chord to support the wing center section of the aircraft; and
a lower chord disposed underneath the keel attach chord, wherein the front edge of the forward web extends in the diagonal direction from the keel attach chord that is downward and aft toward the lower chord to create the open area.

11. The aircraft of claim 9 wherein the keel beam assembly further comprises:
a diagonal stiffener disposed along the front edge of the forward web and configured to provide a vertical load path for the keel beam assembly.

12. The aircraft of claim 11 wherein:
the wing center section includes a gusset to support the vertical load path for the diagonal stiffener.

13. The aircraft of claim 9 wherein:
the forward bulkhead comprises a front spar offset pressure barrier, and
the aft bulkhead comprises an aft wheel well bulkhead of the aircraft.

14. A keel beam assembly of an aircraft, the keel beam assembly comprising:
a pair of keel attach chords to connect to a wing center section of the aircraft, wherein each keel attach chord of the pair of keel attach chords is external to and underneath the wing center section, wherein each keel attach chord of the pair of keel attach chords extends in a longitudinal direction between a corresponding rear spar and corresponding front spar of the aircraft, wherein the pair of keel attach chords are attached to a lower skin panel of the wing center section;
a pair of lower chords disposed underneath the pair of keel attach chords to span a fuselage cutout of the aircraft from an aft bulkhead to a forward bulkhead; and
a pair of forward webs to form sidewalls connecting the pair of keel attach chords to the pair of lower chords, wherein each forward web of the pair of forward webs include a cutback frontside that extends in a diagonal direction from a keel attach chord of the pair of keel attach chords that is downward and aft toward the a lower chord of the pair of lower chords to create an open area between the forward bulkhead and the keel beam assembly, wherein a corner, at which each forward web of the pair of forward webs joins a corresponding keel attach chord of the pair of keel attach chords, is disposed directly underneath the corresponding front spar of the corresponding keel attach chord.

15. The keel beam assembly of claim 14 wherein
the pair of forward webs are configured to provide flexibility in the keel beam assembly to allow independent movement between a fuselage pressure barrier and wings of the aircraft.

16. The keel beam assembly of claim 14 further comprising:
a pair of diagonal stiffeners disposed along the cutback frontside configured to provide a vertical load path for the keel beam assembly.

17. The keel beam assembly of claim 16 wherein:
the pair of diagonal stiffeners are coupled with each other with one or more transverse stiffeners and one or more transverse webs.

18. The keel beam assembly of claim 16 further comprising:
a pair of closeout end fittings to couple the pair of diagonal stiffeners with the pair of keel attach chords.

19. The keel beam assembly of claim 14 wherein:
the open area is sized to accommodate access for installing the keel beam assembly into an aircraft.

20. The aircraft of claim 9 wherein:
the front edge of the forward web is configured to provide flexibility in the keel beam assembly to allow independent movement between a fuselage pressure barrier and wings of the aircraft.

* * * * *